United States Patent
Yanagawa et al.

(12)

(10) Patent No.: US 10,906,503 B2
(45) Date of Patent: Feb. 2, 2021

(54) WEBBING TAKE-UP DEVICE

(71) Applicant: KABUSHIKI KAISHA TOKAI-RIKA-DENKI-SEISAKUSHO, Aichi (JP)

(72) Inventors: Wataru Yanagawa, Aichi (JP); Shinichi Okubo, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 217 days.

(21) Appl. No.: 16/303,408

(22) PCT Filed: Jun. 7, 2017

(86) PCT No.: PCT/JP2017/021182
§ 371 (c)(1),
(2) Date: Nov. 20, 2018

(87) PCT Pub. No.: WO2017/213186
PCT Pub. Date: Dec. 14, 2017

(65) Prior Publication Data
US 2020/0276955 A1   Sep. 3, 2020

(30) Foreign Application Priority Data
Jun. 9, 2016 (JP) .................. 2016-115594

(51) Int. Cl.
*B60R 22/28* (2006.01)
*B60R 22/46* (2006.01)

(52) U.S. Cl.
CPC .............. *B60R 22/28* (2013.01); *B60R 22/46* (2013.01)

(58) Field of Classification Search
CPC ................................ B60R 22/28; B60R 22/46
See application file for complete search history.

(56) References Cited

U.S. PATENT DOCUMENTS

| 2011/0215184 A1 | 9/2011 | Clute et al. |
| 2014/0263798 A1 | 9/2014 | Ukita et al. |
| 2015/0175124 A1 | 6/2015 | Yanagawa et al. |

FOREIGN PATENT DOCUMENTS

| JP | 2010-030502 A | 2/2010 |
| JP | 2012-509808 A | 4/2012 |

(Continued)

OTHER PUBLICATIONS

International Search Report and Written Opinion issued in corresponding International Application No. PCT/JP2017/021182 dated Aug. 8, 2017.

*Primary Examiner* — Sang K Kim
(74) *Attorney, Agent, or Firm* — Roberts Calderon Safran & Cole P.C.

(57) ABSTRACT

A webbing take-up device includes a spool. The webbing take-up device also includes a lock base and a coupling member that are provided so as to rotatable as an integral unit with the spool, and that engage with a rack so as to be rotated and to rotate the spool in a take-up direction when the rack is moved. The webbing take-up device further includes a rack housing section that includes a pair of wall spaced apart from each other in a rotation axis direction of the lock base and the coupling member so as to form a space in which the lock base and the coupling member are disposed. The rack housing section is provided with an abutted portion that is abutted by a part of the coupling member so as to restrict the lock base and the coupling member from moving in the rotation axis direction.

4 Claims, 6 Drawing Sheets

(56) References Cited

FOREIGN PATENT DOCUMENTS

| | | |
|---|---|---|
| JP | 2013-249030 A | 12/2013 |
| JP | 2014-180905 A | 9/2014 |
| JP | 2015-120432 A | 7/2015 |
| JP | 2016-078531 A | 5/2016 |

WEBBING TAKE-UP DEVICE

CROSS-REFERENCE TO RELATED APPLICATIONS

The present application is a U.S. National Phase of PCT/JP2017/021182 filed on Jun. 7, 2017, claiming priority to Japanese Patent Application No. 2016-115594 filed Jun. 9, 2016. The disclosure of the PCT Application is hereby incorporated by reference into the present Application.

TECHNICAL FIELD

The present invention relates to a webbing take-up device.

BACKGROUND ART

Japanese National-Phase Publication 2012-509808 discloses a webbing take-up device including a spool that takes up a webbing, a rotating body that is provided so as to be capable of rotating as an integral unit with the spool and that is rotated in a vehicle emergency so as to rotate the spool in a take-up direction, and a moving member that is moved so as to engage with the rotating body and rotate the rotating body.

However, if the rotating body moves in a rotation axis direction of the rotating body when the moving member engages with the rotating body, it is conceivable that kinetic energy of the moving member might not be efficiently transmitted to the rotating body.

SUMMARY OF INVENTION

Technical Problem

In consideration of the above circumstances, an object of the present disclosure is to obtain a webbing take-up device capable of restricting rotation axis direction movement of a rotating body when rotated by a moving member.

Solution to Problem

A webbing take-up device of a first aspect of the present disclosure includes a spool, a rotating body, and a rotating body placement section. The spool takes up a webbing worn by an occupant by being rotated in a take-up direction, and is rotated in a pull-out direction when the webbing is pulled out. The rotating body is provided so as to be rotatable as an integral unit with the spool, and is rotated so as to rotate the spool in the take-up direction when a moving member is moved and engages with the rotating body. The rotating body placement section includes a pair of wall portions disposed spaced apart from each other in a rotation axis direction of the rotating body so as to form a space between the pair of wall portions in which the rotating body is disposed. The rotating body placement section includes an abutted portion that is abutted by a part of the rotating body or by a part of the spool so as to restrict the rotating body from moving in the rotation axis direction.

A webbing take-up device of a second aspect of the present disclosure is the webbing take-up device of the first aspect, further including an energy absorption member that is provided between the spool and the rotating body, and that deforms so as to permit rotation of the spool in the pull-out direction with respect to the rotating body. The part of the rotating body is configured to abut the abutted portion A webbing take-up device of a third aspect of the present disclosure is the webbing take-up device of the second aspect, wherein the energy absorption member is a torsion shaft that undergoes torsional deformation in a rotation-circumferential direction of the spool.

A webbing take-up device of a fourth aspect of the present disclosure is the webbing take-up device of the first aspect to the third aspect, wherein the spool and the rotating body placement section are disposed substantially adjacent to each other in the rotation axis direction. Moreover, the abutted portion is provided to the wall portion nearest to the spool out of the pair of wall portions.

A webbing take-up device of a fifth aspect of the present disclosure is the webbing take-up device of any one of the second aspect to the fourth aspect, wherein the part of the rotating body extends further toward a radial direction outer side of the spool than a radial direction outer periphery of the spool at a rotating body placement section side of the spool.

Advantageous Effects of Invention

In the webbing take-up device of the first aspect of the present disclosure, the moving member is moved so as to engage with the rotating body and rotate the rotating body. The spool is thereby rotated in the take-up direction, and the webbing is taken up onto the spool. Note that the rotating body is disposed between the pair of wall portions of the rotating body placement section. The part of the rotating body or part of the spool is configured to abut the abutted portion of the rotating body placement section, enabling the rotating body to be restricted from moving in an axial direction of the rotating body.

In the webbing take-up device of the second aspect of the present disclosure, the energy absorption member deforms when load acts on the webbing, thereby permitting rotation of the spool in the pull-out direction with respect to the rotating body. The part of the rotating body abuts the abutted portion of the rotating body placement section, thereby restricting the rotating body from moving in the axial direction. By applying a configuration in which a part of the spool does not abut (slides against) the abutted portion of the rotating body placement section, the generation of friction between the spool and the abutted portion of the rotating body placement section can be suppressed. The load on the webbing that causes the energy absorption member to deform can accordingly be stabilized.

In the webbing take-up device of the third aspect of the present disclosure, the torsion shaft undergoes torsional deformation in the rotation-circumferential direction of the spool, thereby permitting the spool to rotate in the pull-out direction with respect to the rotating body. It is conceivable that the axial direction (spool axial direction) dimension of the torsion shaft might change when the torsion shaft undergoes torsional deformation in the rotation-circumferential direction of the spool. Even in cases in which the axial direction dimension of the torsion shaft changes, the part of the rotating body abuts the abutted portion of the rotating body placement section, enabling the rotating body to be restricted from moving in the axial direction.

In the webbing take-up device of the fourth aspect of the present disclosure, the rotating body can be restricted from moving in the rotation axis direction by the abutted portion provided at the wall portion that is nearest to the spool. This enables the engaged state of the moving member to the rotating body to be stabilized, enabling kinetic energy of the moving member to be efficiently transmitted to the rotating body. Namely, a reduction in the rotation force of the spool when taking up the webbing onto the spool can be suppressed.

In the webbing take-up device of the fifth aspect of the present disclosure, the part of the rotating body configured to abut the abutted portion extends further toward the radial direction outer side of the spool than the radial direction outer periphery of the spool, thereby enabling the generation of friction between the spool and the abutted portion of the wall portion to be suppressed. The load on the webbing and the spool that causes the energy absorption member to deform can accordingly be stabilized.

DESCRIPTION OF EMBODIMENTS

Webbing Take-Up Device According to a First Exemplary Embodiment

Figure 1:
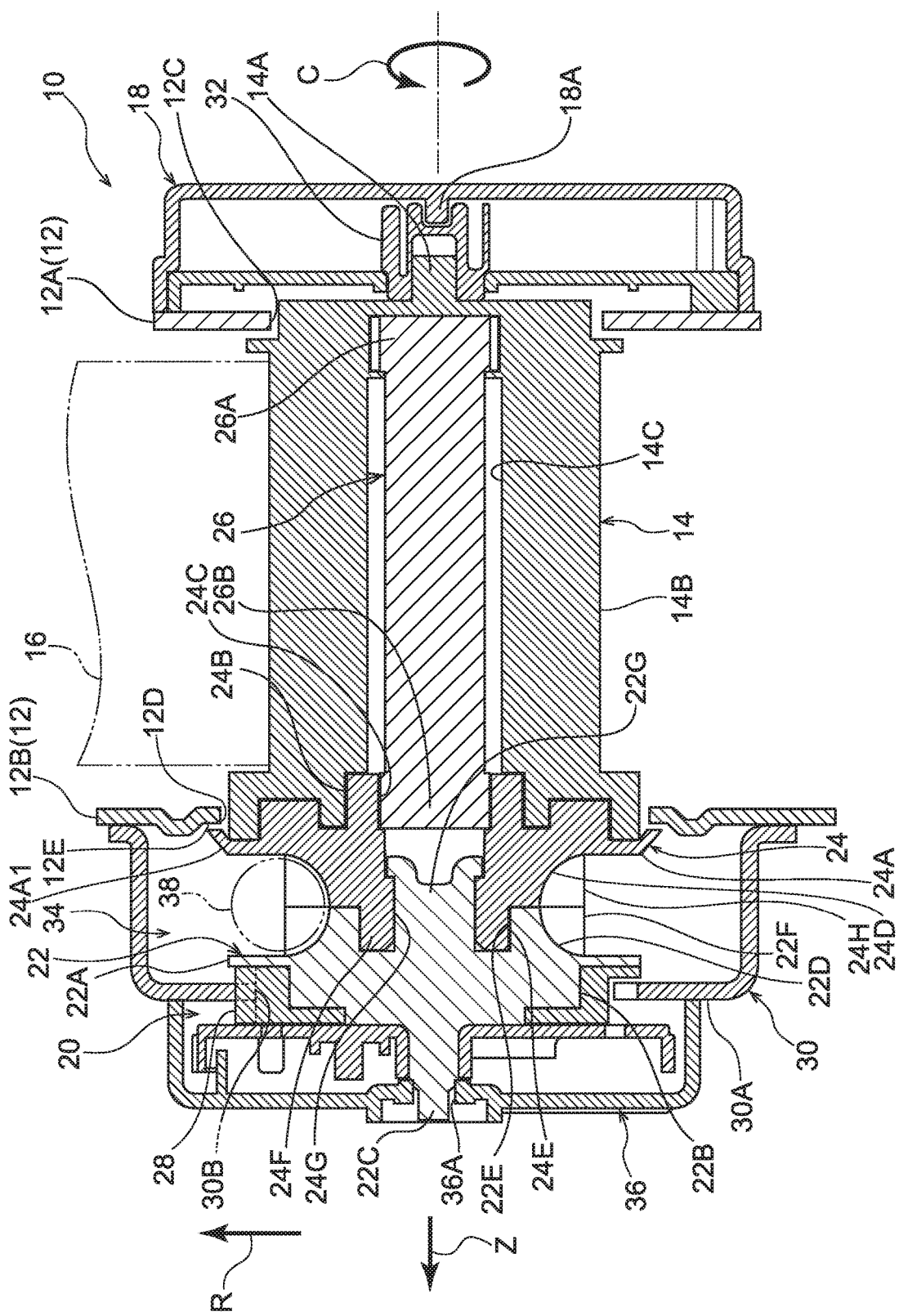
FIG. 1 is a cross-section illustrating a webbing take-up device according to a first exemplary embodiment, sectioned along a rotation axis direction of a spool.

Explanation follows regarding a webbing take-up device according to a first exemplary embodiment of the present invention, with reference to FIG. 1. Note that in the drawings, the arrow Z direction, the arrow R direction, and the arrow C direction respectively indicate a rotation axis direction, a rotation radial direction, and a rotation-circumferential direction of a spool, as appropriate. In the following explanation, unless specifically stated otherwise, reference simply to an axial direction, radial direction, or circumferential direction refers respectively to the rotation axis direction, the rotation radial direction, or the rotation-circumferential direction of the spool.

As illustrated in FIG. 1, a webbing take-up device 10 includes a metal frame 12. For example, the frame 12 is fixed to a pillar configuring vehicle body framework, or to a seat cushion frame configuring framework of a vehicle seat in a vehicle. The frame 12 includes a leg plate 12A and a leg plate 12B, serving as a wall portion, disposed so as to face each other across an axial direction spacing. Circular insertion holes 12C, 12D, through which are inserted respective parts of a spool 14, described later, are formed in the leg plate 12A and the leg plate 12B respectively. A portion peripheral to an edge of the insertion hole 12D formed at the leg plate 12B configures an abutted portion 12E that is abutted by part of a coupling member 24, described later.

The spool 14 is made of metal, and the majority of the spool 14 is formed in a substantially circular cylindrical shape disposed between the leg plate 12A and the leg plate 12B of the frame 12. A shaft portion 14A is provided at another axial direction side (the opposite side to the arrow Z direction) end portion of the spool 14. The shaft portion 14A is supported by a shaft support portion 18A provided at a spring housing 18, described later, through a spiral spring anchor member 32. The spool 14 also includes a take-up portion 14B onto which a webbing 16 is taken up. A length direction base end portion of the webbing 16, formed in an elongated belt shape, is anchored to the take-up portion 14B. When the spool 14 is rotated in a take-up direction (arrow C direction) the webbing 16 is taken up onto the take-up portion 14B of the spool 14 from the length direction base end side. When the webbing 16 is pulled out from the spool 14, the spool 14 is rotated in a pull-out direction (the opposite direction to the arrow C). A torsion shaft insertion hole 14C, into which a torsion shaft 26, described later, is inserted, is formed at an axial center portion of the spool 14. One axial direction side of the torsion shaft insertion hole 14C is open, whereas the other axial direction side of the torsion shaft insertion hole 14C is closed off.

A length direction leading end side of the webbing 16 extends from the spool 14 toward the vehicle upper side. The length direction leading end side of the webbing 16 passes through a slit formed in a through anchor (not illustrated in the drawings) at the vehicle upper side of the frame 12, and is folded back on itself toward the vehicle lower side.

A length direction leading end portion of the webbing 16 is anchored to an anchor plate (not illustrated in the drawings). The anchor plate is formed by a steel metal plate or the like, and is fixed to a floor section (not illustrated in the drawings) of the vehicle, a framework member of the seat (not illustrated in the drawings) corresponding to the webbing take-up device 10, or the like.

A vehicle seatbelt device applied with the webbing take-up device 10 also includes a buckle device (not illustrated in the drawings). The buckle device is provided at a vehicle width direction inner side of the seat applied with the webbing take-up device 10. A tongue (not illustrated in the drawings) provided to the webbing 16 is engaged with the buckle device in a state in which the webbing 16 has been wrapped across the body of an occupant seated in the seat, such that the webbing 16 is worn across the body of the occupant.

The resin spring housing 18 including the above-mentioned shaft support portion 18A is provided at an outer face side of the leg plate 12A of the frame 12 (at the outside of the frame 12). A spiral spring (not illustrated in the drawings) with one end portion anchored to the resin spiral spring anchor member 32 is provided inside the spring housing 18. The spool 14 is urged in the take-up direction (arrow C direction) by urging force of the spiral spring.

A locking mechanism 20 is provided at an outer face side of the leg plate 12B of the frame 12 (at the outside of the frame 12). The locking mechanism 20 includes a metal lock base 22 configuring part of a rotating body, and a metal locking pawl 28 supported by the lock base 22. The lock base 22 is provided coaxially to the spool 14 on the one axial direction side of the spool 14. The lock base 22 is connected to the spool 14 through the metal coupling member 24 configuring another part of the rotating body, and through the torsion shaft 26, such that the lock base 22 is capable of rotating as an integral unit with the spool 14.

The locking mechanism 20 also includes a sensor mechanism (not illustrated in the drawings). The sensor mechanism is actuated in a vehicle emergency such as a vehicle collision or sudden deceleration. As described in detail below, the lock base 22 is prevented from rotating in the pull-out direction (the pull-out direction of the spool 14) when the sensor mechanism is actuated.

A metal cover plate 30 is fixed to the leg plate 12B of the frame 12. The cover plate 30 and the leg plate 12B of the frame 12 form a rack housing section 34, serving as a rotating body placement section in which the majority of the lock base 22 and the coupling member 24 are disposed.

The cover plate 30 is recessed toward the opposite side to the frame 12, and includes a plate portion 30A serving as a wall portion disposed facing the leg plate 12B of the frame 12 in the axial direction. A ratchet hole 30B is formed penetrating the plate portion 30A. The lock base 22 of the locking mechanism 20 passes through the ratchet hole 30B in the cover plate 30. When the sensor mechanism of the locking mechanism 20 is actuated and the locking pawl 28 attached to the lock base 22 moves toward the radial direction outer side of the lock base 22, the locking pawl 28 meshes with ratchet teeth of the ratchet hole 30B at the cover plate 30. The lock base 22 is thereby prevented from rotating in the pull-out direction. The spool 14, which is connected to the lock base 22 through the coupling member 24 and the torsion shaft 26, is consequently restricted from rotating in the pull-out direction.

The webbing take-up device 10 also includes the torsion shaft 26, serving as an energy absorption member. The torsion shaft 26 is formed in a rod shape, and is housed in the torsion shaft insertion hole 14C at the spool 14 so as to be disposed running along the axial direction of the spool 14. One side end portion 26A of the torsion shaft 26 is anchored to the spool 14, and another side end portion 26B of the torsion shaft 26 is anchored to the coupling member 24, and thereby connected to the lock base 22. Torsional deformation of a length direction intermediate portion of the torsion shaft 26 when the lock base 22 is prevented from rotating in the pull-out direction permits the webbing 16 to rotate the spool 14 in the pull-out direction.

Detailed explanation follows regarding configuration of the lock base 22 and the coupling member 24, these being relevant portions of the present exemplary embodiment.

The lock base 22 includes a lock base-side flange 22A formed in a disc shape with its thickness direction along the axial direction. The lock base 22 also includes a substantially circular column shaped circular column portion 22B that projects toward the one axial direction side from the lock base-side flange 22A and that is cut away at a portion where the aforementioned locking pawl 28 is disposed. A rod shaped shaft portion 22C projects toward the one axial direction side from an axial center portion of the circular column portion 22B. The shaft portion 22C is inserted through a shaft support hole 36A formed in a locking mechanism housing cover 36 attached to the cover plate 30, and is supported by an inner peripheral face of the shaft support hole 36A.

The lock base 22 also includes a lock base-side tube-shaped portion 22D that projects toward the other axial direction side from the lock base-side flange 22A. The lock base-side tube-shaped portion 22D is formed such that an external diameter of a radial direction outer side face of the lock base-side tube-shaped portion 22D decreases on progression toward the other axial direction side. A spline-shaped lock base-side spline 22E is formed at an inner peripheral portion of the lock base-side tube-shaped portion 22D. Plural lock base-side engagement teeth 22F are provided at an outer peripheral portion of the lock base-side tube-shaped portion 22D so as to be disposed at predetermined spacings about the circumferential direction. Note that a lock base-side core portion 22Q formed in a tube shape and having a larger diameter than the shaft portion 22C, is provided at an axial center portion of the lock base-side tube-shaped portion 22D.

The coupling member 24 includes a coupling member-side flange 24A formed in a disc shape with its thickness direction along the axial direction. An external diameter of the coupling member-side flange 24A is larger than a diameter of the insertion hole 12D formed in the leg plate 12B of the frame 12. A radial direction outer side end portion 24A1 of the coupling member-side flange 24A and the abutted portion 12E, this being the portion peripheral to the edge of the insertion hole 12D formed in the leg plate 12B, are disposed so as to overlap each other in the axial direction.

The coupling member 24 also includes a torsion shaft engagement portion 24B formed in a circular tube shape projecting toward the other axial direction side from the coupling member-side flange 24A. A spline-shaped torsion shaft engagement spline 24C that engages with the other side end portion 26B of the torsion shaft 26 is formed at an inner peripheral portion of the torsion shaft engagement portion 24B.

The coupling member 24 also includes a coupling member-side tube-shaped portion 24D that projects toward the one axial direction side from the coupling member-side flange 24A. The coupling member-side tube-shaped portion 24D is formed such that an external diameter of a radial direction outer side face of the coupling member-side tube-shaped portion 24D decreases on progression toward the one axial direction side. A coupling member-side core portion 24F that projects toward the one axial direction side is provided to an inner peripheral portion of the coupling member-side tube-shaped portion 24D. A spline-shaped coupling member-side spline 24E that engages with the lock base-side spline 22E of the lock base 22 is formed to an outer peripheral portion of the coupling member-side core portion 24F. Note that an insertion hole 24Q into which the lock base-side core portion 22G of the lock base 22 is inserted, is formed in an axial center portion of the coupling member-side core portion 24F. The lock base-side core portion 22G of the lock base 22 is inserted into the insertion hole 24G of the coupling member-side core portion 24F, and the coupling member-side spline 24E engages with the lock base-side spline 22E, such that the lock base 22 and the coupling member 24 are joined together so as to be capable of rotating together as an integral unit. Note that in the present exemplary embodiment, a leading end portion of the lock base-side core portion 22G of the lock base 22 is crimped (squashed) such that the join between the lock base 22 and the coupling member 24 does not come apart.

Plural coupling member-side engagement teeth 24H are provided to an outer peripheral portion of the coupling member-side tube-shaped portion 24D so as to be disposed at predetermined spacings about the circumferential direction. In a state in which the lock base 22 and the coupling member 24 have been joined together, the coupling member-side engagement teeth 24H and the lock base-side engagement teeth 22F are disposed at the same positions about the circumferential direction. A rack 38, serving as a moving member, engages with the coupling member-side engagement teeth 24H and the lock base-side engagement teeth 22F. The rack 38 is formed in a rod shape using a softer material than that of the lock base 22 and the coupling member 24 (for example a synthetic resin). The rack 38 is disposed inside a non-illustrated pipe. In a vehicle emergency, the rack 38 is moved inside the pipe and inside the cover plate 30 (at the interior of the rack housing section 34) due to the pressure of gas supplied from a non-illustrated micro gas generator, such that the rack 38 engages with the coupling member-side engagement teeth 24H and the lock base-side engagement teeth 22F. The lock base 22 and the coupling member 24 are thereby rotated toward one circumferential direction side (the arrow C side), such that the spool 14, which is connected to the lock base 22 and the coupling member 24 through the torsion shaft 26, is rotated in the take-up direction.

Operation and Advantageous Effects of Present Exemplary Embodiment

Explanation follows regarding operation and advantageous effects of the present exemplary embodiment.

As illustrated in FIG. 1, in the webbing take-up device 10 of the present exemplary embodiment, in a vehicle collision, this being one example of vehicle emergency, the locking pawl 28 meshes with the ratchet teeth of the ratchet hole 30B, thereby preventing the lock base 22 from rotating in the pull-out direction (the opposite direction to the arrow C). When the non-illustrated micro gas generator is actuated in a vehicle collision, high pressure gas generated by the micro gas generator is instantaneously supplied into the pipe inside which the rack 38 is disposed. Moved by the pressure of the gas, the rack 38 engages with and presses the coupling member-side engagement teeth 24H of the coupling member 24 and the lock base-side engagement teeth 22F of the lock base 22, thereby rotating the spool 14 in the take-up direction (arrow C direction) together with the coupling member 24 and the lock base 22. The webbing 16 is thereby taken up onto the take-up portion 14B of the spool 14, and the restraint force on the occupant from the webbing 16 is increased.

Figure 2:
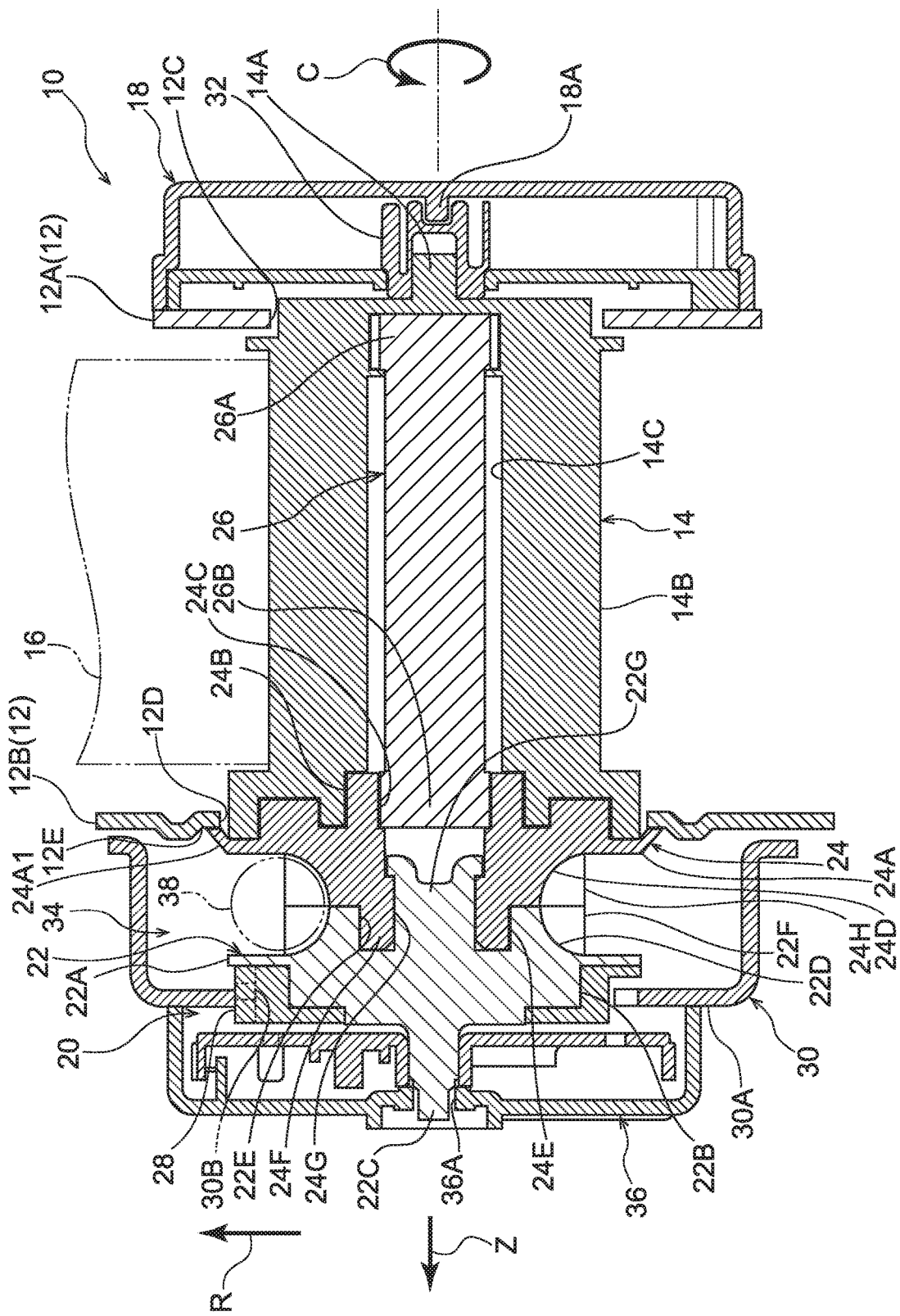
FIG. 2 is a cross-section corresponding to FIG. 1, illustrating a webbing take-up device in a state in which a coupling member-side flange has abutted a frame.

Note that in the present exemplary embodiment, as illustrated in FIG. 2, if the lock base 22 and the coupling member 24 move toward the other axial direction side, the radial direction outside end portion 24A1 of the coupling member-side flange 24A of the coupling member 24 abuts the abutted portion 12E, this being the portion peripheral to the edge of the insertion hole 12D formed in the leg plate 12B of the frame 12. This enables the lock base 22 and the coupling member 24 to be restricted from moving toward the other axial direction side. This enables the engaged state of the rack 38 with the coupling member-side engagement teeth 24H and the lock base-side engagement teeth 22F to be stabilized, and enables kinetic energy of the rack 38 to be efficiently transmitted to the coupling member 24 and the lock base 22. Namely, a reduction in the rotation force of the spool 14 when taking up the webbing 16 onto the take-up portion 14B of the spool 14 can be suppressed.

Moreover, the present exemplary embodiment is configured such that the radial direction outer side end portion 24A1 of the coupling member-side flange 24A of the coupling member 24 is made to abut the abutted portion 12E of the leg plate 12B from the side of the cover plate 30, rather than from the side of the leg plate 12A of the frame 12. This enables variation in the meshing depth between the locking pawl 28 and the ratchet teeth of the ratchet hole 30B in the cover plate 30 to be reduced. This enables the cover plate 30 to be made thinner, enabling the webbing take-up device 10 to be made smaller in size and enabling costs to be reduced.

Furthermore, the present exemplary embodiment is configured such that the radial direction outer side end portion 24A1 of the coupling member-side flange 24A of the coupling member 24 is made to abut the leg plate 12B of the frame 12, the rigidity of which is raised by attaching the cover plate 30 thereto. This enables the coupling member-side flange 24A of the coupling member 24 to be suppressed from passing through the insertion hole 12D formed at the leg plate 12B.

Moreover, in the present exemplary embodiment, in a state in which the lock base 22 is prevented from rotating in the pull-out direction, if the body of the occupant pulls on the webbing 16 and pull-out direction rotation force on the spool 14 exceeds a torsion-withstand load (deformation-withstand load) of the torsion shaft 26 as a result of this pulling force, the torsion shaft 26 undergoes torsion (deforms). The spool 14 is thereby permitted to rotate in the pull-out direction by the torsion of the torsion shaft 26, and the webbing 16 is permitted to be pulled out from the spool 14. Energy (kinetic energy of the occupant) corresponding to the amount by which the webbing 16 is pulled out from the spool 14 is therefore absorbed by the deformation of the torsion shaft 26.

Note that as described above, in the present exemplary embodiment, the radial direction outer side end portion 24A1 of the coupling member-side flange 24A of the coupling member 24 abuts the abutted portion 12E of the frame 12, thereby restricting the lock base 22 and the coupling member 24 from moving toward the other axial direction side. This configuration is not one in which a part of the spool 14 abuts (slides against) the abutted portion 12E of the frame 12, enabling the generation of friction between the spool 14 and the abutted portion 12E of the frame 12 to be suppressed. The load on the webbing 16 that causes the torsion shaft 26 to deform can accordingly be stabilized.

Moreover, in the present exemplary embodiment, it is conceivable that the axial direction dimension of the torsion shaft 26 might change when the torsion shaft 26 undergoes torsional deformation. However, in the present exemplary embodiment, even in cases in which the axial direction dimension of the torsion shaft 26 changes (increases, for example), the radial direction outer side end portion 24A1 of the coupling member-side flange 24A of the coupling member 24 abuts the abutted portion 12E of the frame 12, thereby restricting the lock base 22 and the coupling member 24 from moving toward the other axial direction side. Thus, providing clearance (axial direction clearance) between the respective portions of the spool 14 and the frame 12 corresponding to the envisaged change in the axial direction dimension of the torsion shaft 26 enables the spool 14 to be suppressed from sliding against the frame 12.

Webbing Take-Up Device According to a Second Exemplary Embodiment

Figure 3:
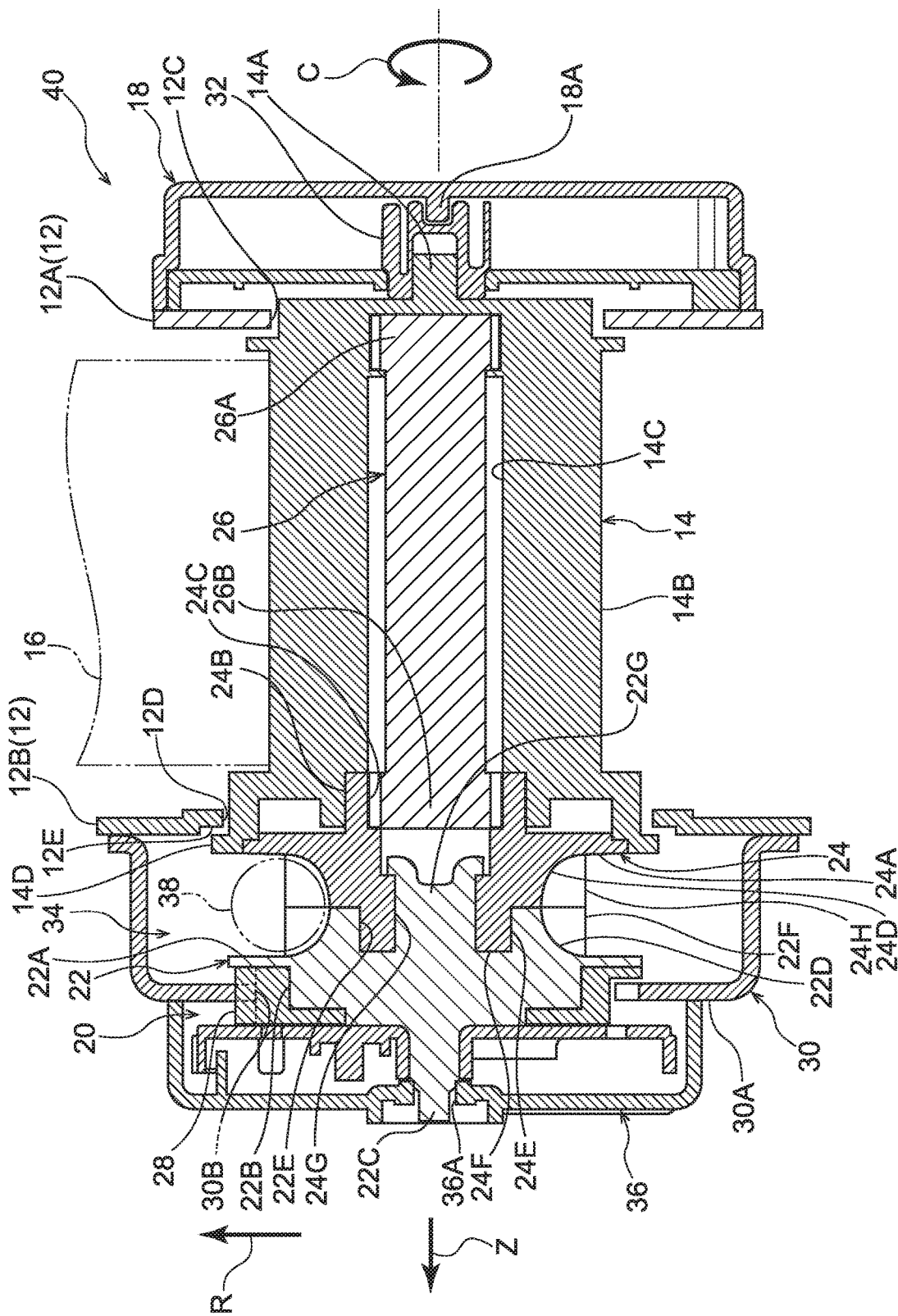
FIG. 3 is a cross-section illustrating a webbing take-up device according to a second exemplary embodiment, sectioned along a rotation axis direction of a spool.

Explanation follows regarding a webbing take-up device according to a second exemplary embodiment of the present invention, with reference to FIG. 3. Note that members and portions corresponding to those in the webbing take-up device 10 according to the first exemplary embodiment are appended with the same reference numerals as in the above exemplary embodiment, and explanation regarding these members and portions may be omitted.

As illustrated in FIG. 3, a feature of a webbing take-up device 40 of the present exemplary embodiment is that the spool 14 is provided with a portion that abuts the abutted portion 12E, this being the portion peripheral to the edge of the insertion hole 12D formed in the leg plate 12B of the frame 12.

A spool-side flange 14D is formed projecting toward the radial direction outer side at the one axial direction side end portion of the spool 14. An external diameter of the spool-side flange 14D is greater than the diameter of the insertion hole 12D formed in the leg plate 12B of the frame 12. The spool-side flange 14D and the abutted portion 12E, this being the portion peripheral to the edge of the insertion hole 12D formed in the leg plate 12B, are therefore disposed so as to overlap each other in the axial direction. Moreover, the coupling member-side flange 24A of the coupling member 24 is disposed at the radial direction inner side of the spool-side flange 14D.

Figure 4:
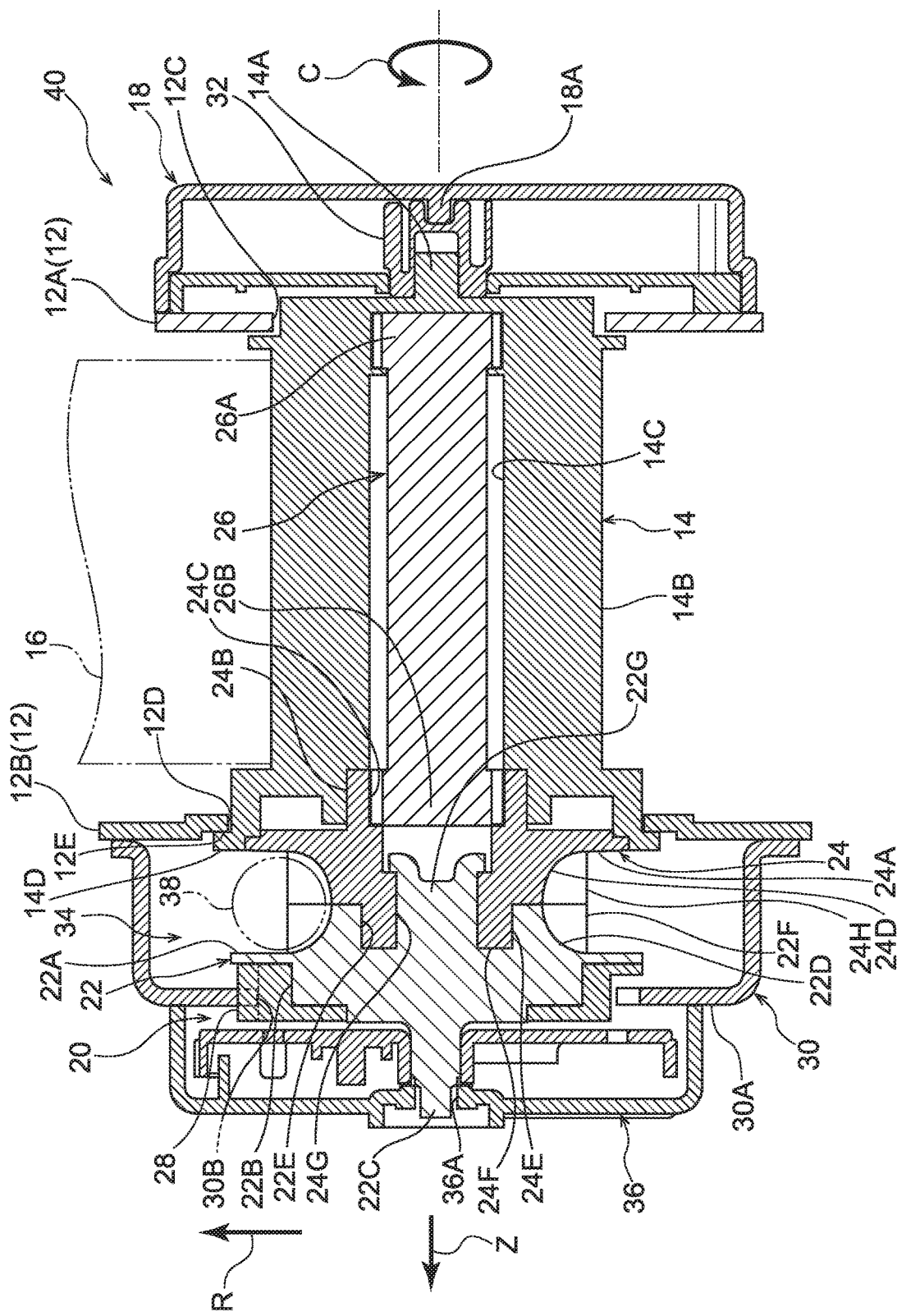
FIG. 4 is a cross-section corresponding to FIG. 3, illustrating a webbing take-up device in a state in which a spool-side flange has abutted a frame.

In the webbing take-up device 40 of the present exemplary embodiment described above, as illustrated in FIG. 4, when the spool 14 moves toward the other axial direction side together with the lock base 22 and the coupling member 24, the spool-side flange 14D of the spool 14 abuts the abutted portion 12E, this being the portion peripheral to the edge of the insertion hole 12D formed at the leg plate 12B of the frame 12. This enables the lock base 22 and the coupling member 24 to be restricted from moving toward the other axial direction side by the spool-side flange 14D of the frame 12. Thus, similarly to in the webbing take-up device 10 according to the first exemplary embodiment described above, the engaged state of the rack 38 with the coupling member-side engagement teeth 24H of the coupling member 24 and the lock base-side engagement teeth 22F of the lock base 22 can be stabilized, and kinetic energy of the rack 38 can be efficiently transmitted to the coupling member 24 and the lock base 22.

Structure to Restrict Axial Direction Movement of Lock Base 22

Figure 5:
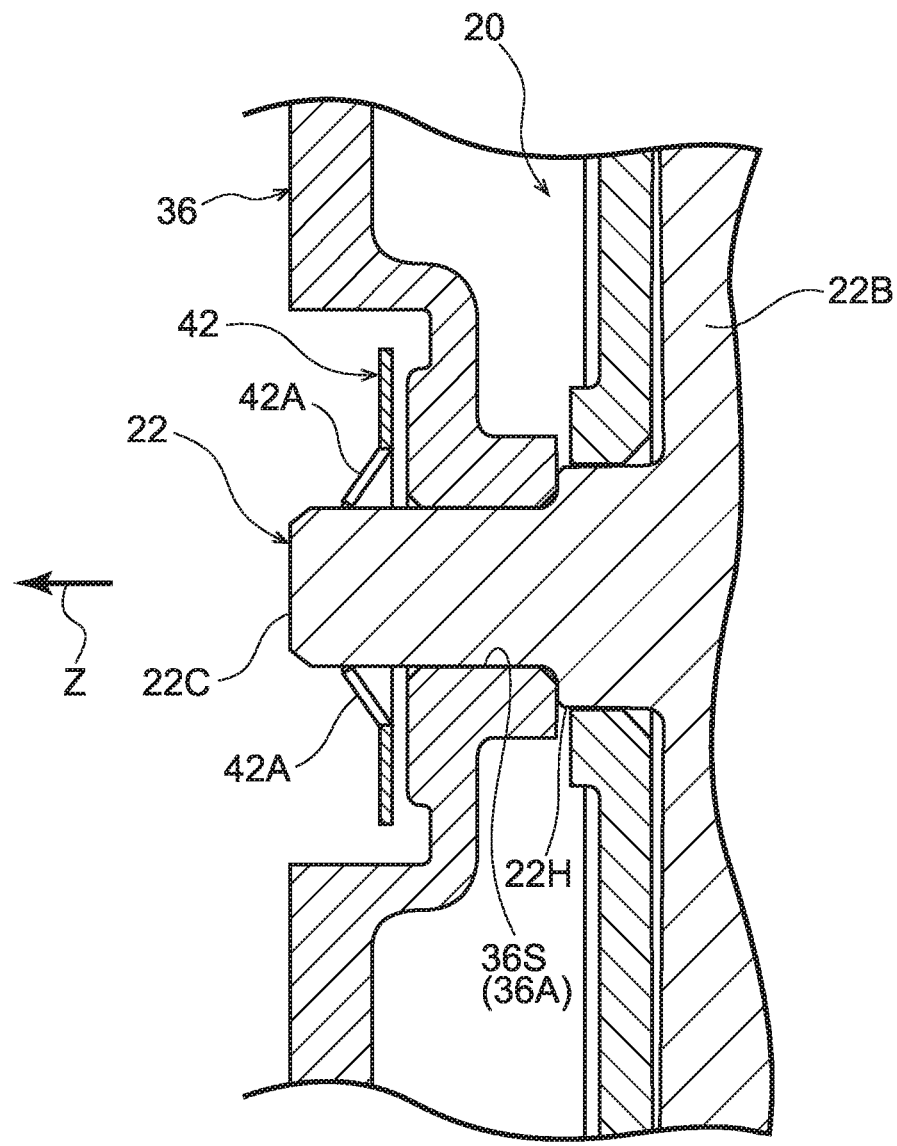
FIG. 5 is an enlarged cross-section, illustrating a portion of a lock base to which a push nut has been attached.

Explanation following regarding a structure for restricting axial direction movement of the lock base 22 according to a reference example of the present invention, with reference to FIG. 5.

As illustrated in FIG. 5, the shaft portion 22C of the lock base 22 is inserted through the shaft support hole 36A formed in the resin locking mechanism housing cover 36 fixed to the cover plate 30 or the frame 12, such that the shaft portion 22C is supported by an inner peripheral face 36S of the shaft support hole 36A. By inserting the shaft portion 22C into a push nut 42 (namely, by fitting the push nut 42 onto the shaft portion 22C from the one axial direction side toward the other axial direction side), the shaft portion 22C is suppressed from coming out of the shaft support hole 36A, and the lock base 22 is restricted from moving toward the other axial direction side with respect to the locking mechanism housing cover 36. Movement of the lock base 22 toward the one axial direction side with respect to the locking mechanism housing cover 36 is restricted by one axial direction side end face of a step portion 22H, formed between the shaft portion 22C and the circular column portion 22B, abutting a portion peripheral to the edge of the shaft support hole 36A. This enables both the coupling member 24 connected to the lock base 22 and the spool 14 to be restricted from moving in the axial direction.

Figure 6:
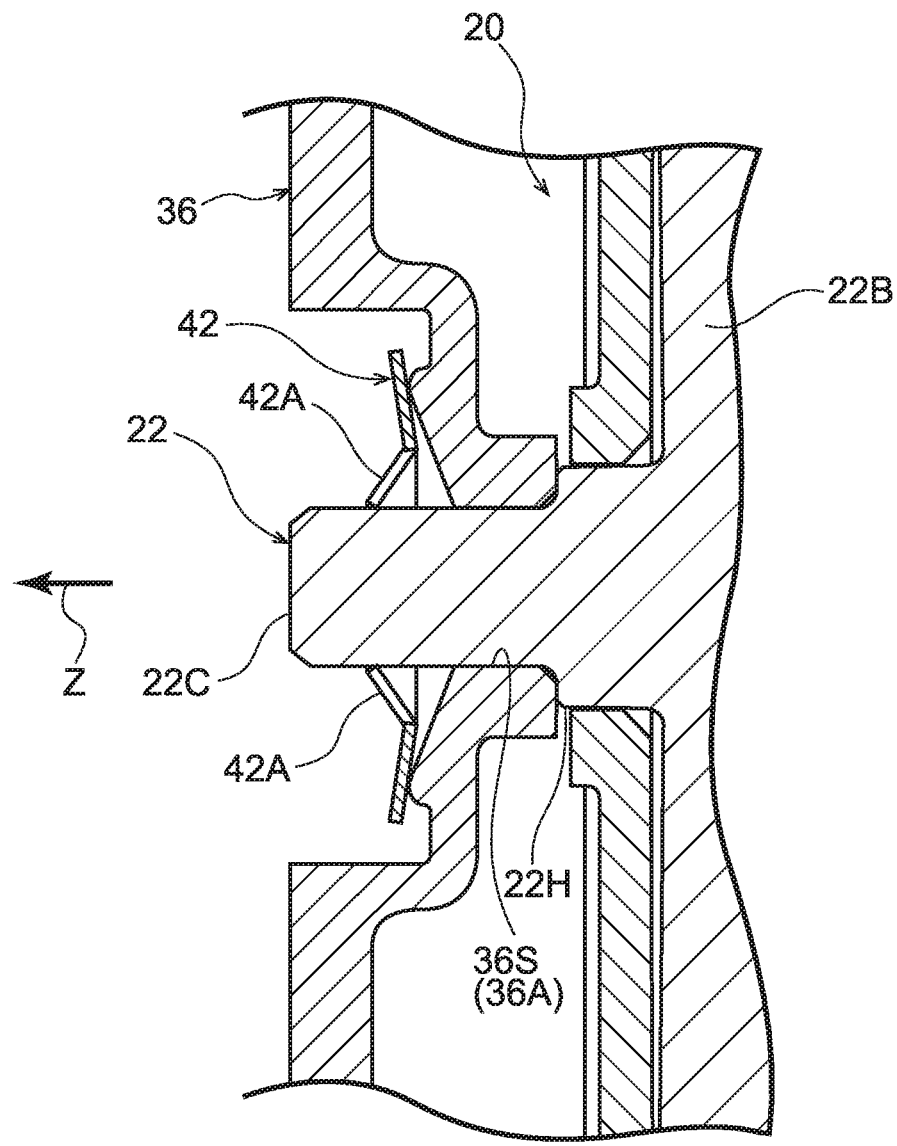
FIG. 6 is an enlarged cross-section, illustrating a portion of a lock base to which a different push nut to that in FIG. 5 has been attached.

The push nut 42 is formed in a ring shape, and includes plural claws 42A at an inner peripheral portion thereof. The claws 42A are angled toward the one axial direction side on progression toward the axial center side of the shaft portion 22C. Thus, if the push nut 42 attempts to move toward the one axial direction side with respect to the shaft portion 22C, leading ends of the claws 42A latch onto an outer peripheral face of the shaft portion 22C (frictional force between the leading ends of the claws 42A and the outer peripheral face of the shaft portion 22C increases), thereby suppressing the push nut 42 from coming off the shaft portion 22C. Setting the external diameter of the push nut 42 with a larger diameter than a portion where the push nut 42 contacts the locking mechanism housing cover 36, namely, having a configuration in which a radial direction outer side end portion of the push nut 42 does not contact the locking mechanism housing cover 36, enables wear of the locking mechanism housing cover 36 due to the radial direction outer side end portion of the push nut 42 sliding against the locking mechanism housing cover 36 to be avoided. Note that as illustrated in FIG. 6, the contact angle of a portion of the push nut 42 contacting the locking mechanism housing cover 36 may be adjusted so as to increase the frictional force between the leading ends of the claws 42A and the outer peripheral face of the shaft portion 22C.

Exemplary embodiments of the present invention have been explained above. However, the present invention is not limited to the above exemplary embodiments, and obviously various other modifications may be implemented within a range not departing from the scope of the present invention.

The entire disclosure of Japanese Patent Application No. 2016-115594 is incorporated by reference in this specification.

All publications, patent applications, and technical standards mentioned in the present specification are incorporated by reference in the present specification to the same extent as if each individual publication, patent application, or technical standard was specifically and individually indicated to be incorporated by reference.

The invention claimed is:

1. A webbing take-up device comprising:
   a spool taking up a webbing worn by an occupant by being rotated in a take-up direction, the spool being rotated in a pull-out direction when the webbing is pulled out;
   a rotating body rotatable as an integral unit with the spool, and being rotated so as to rotate the spool in the take-up direction when a moving member is moved and engages with the rotating body; and
   a rotating body placement section including a pair of wall portions disposed spaced apart from each other in a rotation axis direction of the rotating body so as to form a space between the pair of wall portions in which the rotating body is disposed, the rotating body placement section including an abutted portion that is abutted by a part of the rotating body or by a part of the spool so as to restrict the rotating body from moving in the rotation axis direction, wherein:
   the spool and the rotating body placement section are disposed substantially adjacent to each other in the rotation axis direction, and
   the abutted portion is provided at a wall portion of the pair of wall portions, which is nearest to the spool.

2. The webbing take-up device of claim 1, further comprising:
   an energy absorption member provided between the spool and the rotating body, and deforming so as to permit rotation of the spool in the pull-out direction with respect to the rotating body,
   wherein the part of the rotating body is configured to abut the abutted portion.

3. The webbing take-up device of claim 2, wherein the energy absorption member is a torsion shaft that undergoes torsional deformation in a rotation-circumferential direction of the spool.

4. The webbing take-up device of claim 2, wherein the part of the rotating body extends further toward a radial direction outer side of the spool than a radial direction outer periphery of the spool at a rotating body placement section side of the spool.

* * * * *